(12) United States Patent
Redert et al.

(10) Patent No.: US 8,599,403 B2
(45) Date of Patent: Dec. 3, 2013

(54) FULL DEPTH MAP ACQUISITION

(75) Inventors: Peter-Andre Redert, Eindhoven (NL); Cornelius Wilhelmus Antonius Marie Van Overveld, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1749 days.

(21) Appl. No.: 10/542,137

(22) PCT Filed: Dec. 10, 2003

(86) PCT No.: PCT/IB03/06364
§ 371 (c)(1),
(2), (4) Date: Jul. 12, 2005

(87) PCT Pub. No.: WO2004/066212
PCT Pub. Date: Aug. 5, 2004

(65) Prior Publication Data
US 2006/0056679 A1    Mar. 16, 2006

(30) Foreign Application Priority Data
Jan. 17, 2003   (EP) .................................... 03100092

(51) Int. Cl.
| G06F 3/12 | (2006.01) |
| G06F 15/00 | (2006.01) |
| G06K 1/00 | (2006.01) |
| G06K 15/00 | (2006.01) |
| H04N 1/40 | (2006.01) |
| H04N 1/60 | (2006.01) |
| H04N 1/405 | (2006.01) |

(52) U.S. Cl.
USPC ............. 358/1.15; 358/1.1; 358/1.9; 358/2.1; 358/3.07; 358/3.08; 382/154; 382/285; 345/418; 345/419; 345/420; 345/422; 348/42; 348/43; 348/47

(58) Field of Classification Search
USPC .......... 382/154, 285; 345/419, 420, 587, 422, 345/582, 418; 348/1.9, 47
See application file for complete search history.

(56) References Cited

U.S. PATENT DOCUMENTS

| 6,791,540 B1 * | 9/2004 | Baumberg ..................... 345/419 |
| 6,868,191 B2 * | 3/2005 | Nister ............................ 382/285 |
| 6,903,735 B2 * | 6/2005 | Jeong et al. ................... 345/418 |
| 6,952,204 B2 * | 10/2005 | Baumberg et al. ............ 345/420 |
| 6,954,212 B2 * | 10/2005 | Lyons et al. .................. 345/582 |

(Continued)

OTHER PUBLICATIONS

L. Robert et al; "Dense Depth Map Reconstruction: A Minimization and Regularization Approach Which Preserves Discontinuities", Computer Vision-ECCV '96, 4th Eurpean Conference on Comoputer Proceedings Springer-Verlag Berlin, Germany, vol. 1, 1996, pp. 439-451, XP008040195.

(Continued)

Primary Examiner — Satwant Singh

(57) ABSTRACT

The invention relates to a method for acquiring a substantially complete depth map from a 3-D scene. Both depth values and derivates of depth values may be used to calculate a pixel dense depth map with the steps of acquiring partial depth map from said 3-D scene, acquiring derivates of depth information from said scene, and extending said partial depth map by adding non-relevant information to said partial depth map, creating a pixel dense full depth map being spatially consistent with both said partial depth map and said derivates of depth information.

14 Claims, 3 Drawing Sheets

(56) References Cited

U.S. PATENT DOCUMENTS

Figure 2:
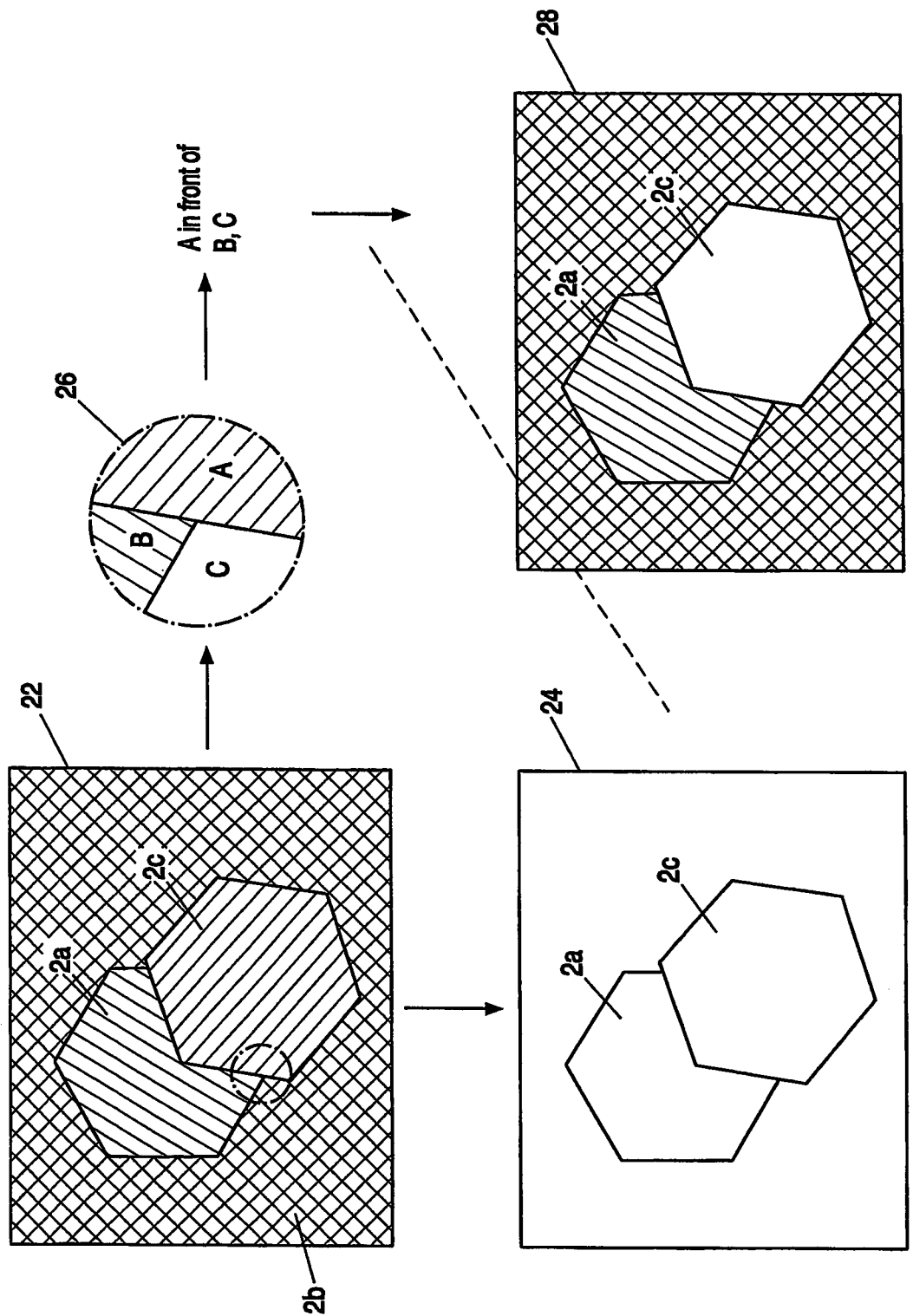

| | | | |
|---|---|---|---|
| 6,975,326 B2* | 12/2005 | Baumberg et al. | 345/582 |
| 6,975,329 B2* | 12/2005 | Bastos et al. | 345/587 |
| 7,054,478 B2* | 5/2006 | Harman | 382/154 |
| 7,103,211 B1* | 9/2006 | Medioni et al. | 382/154 |
| 7,113,634 B2* | 9/2006 | Yano | 382/154 |
| 7,113,635 B2* | 9/2006 | Robert et al. | 382/154 |
| 7,139,423 B1* | 11/2006 | Nicolas et al. | 382/154 |
| 7,280,106 B2* | 10/2007 | Hong et al. | 345/420 |
| 7,304,647 B2* | 12/2007 | Hong et al. | 345/582 |
| 2001/0052935 A1* | 12/2001 | Yano | 348/207 |
| 2002/0186216 A1* | 12/2002 | Baumberg et al. | 345/422 |
| 2012/0200667 A1* | 8/2012 | Gay et al. | 348/43 |
| 2013/0027512 A1* | 1/2013 | Aronsson et al. | 348/42 |

OTHER PUBLICATIONS

R. Lengagne et al; "Incorporating Differential Constraints in a 3D Reconstruction Process Application to Stereo", Proceedings Eighth IEEE Intn'l Conference on Computer Vision. ICCV 2001 IEEE Comput. Soc Los Alamitos, CA, vol. 1, 2001, pp. 573-580, XP002310426.

* cited by examiner

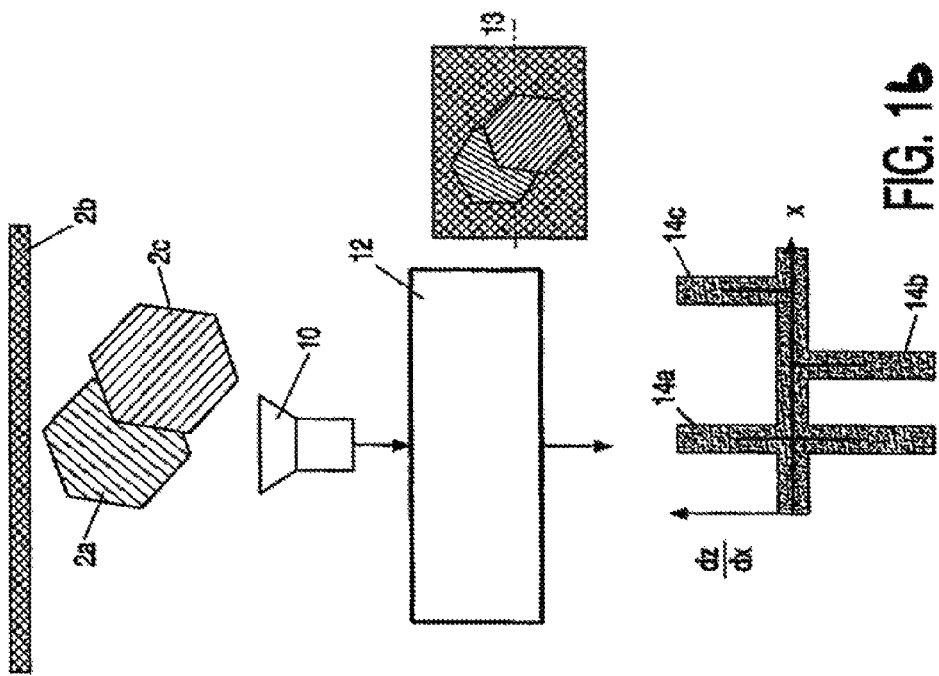
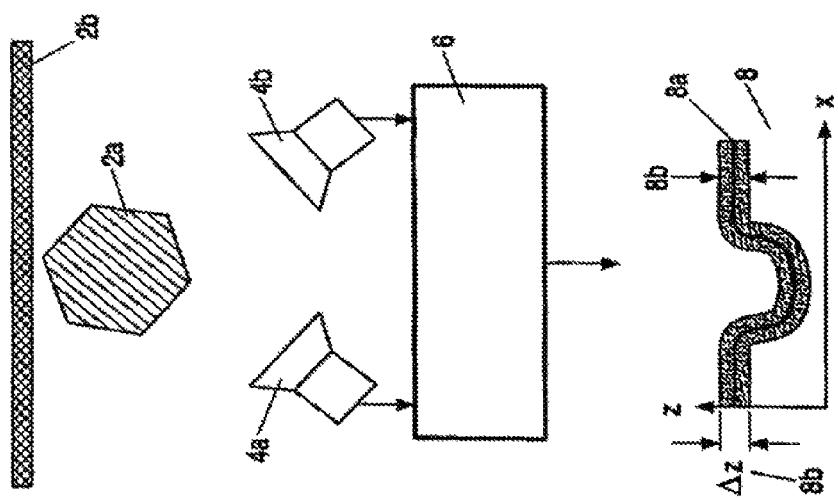

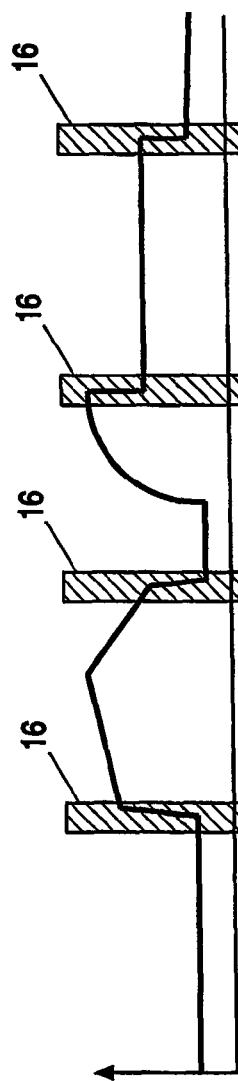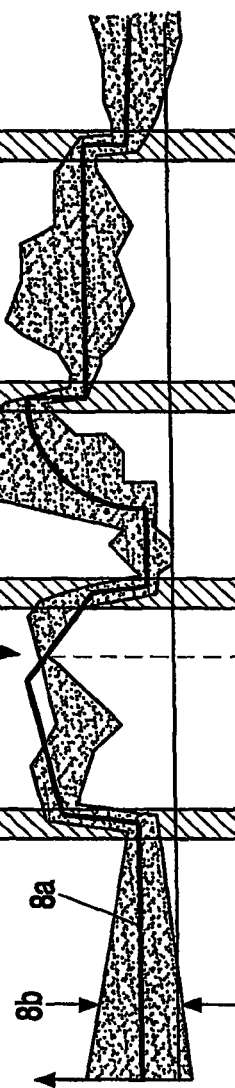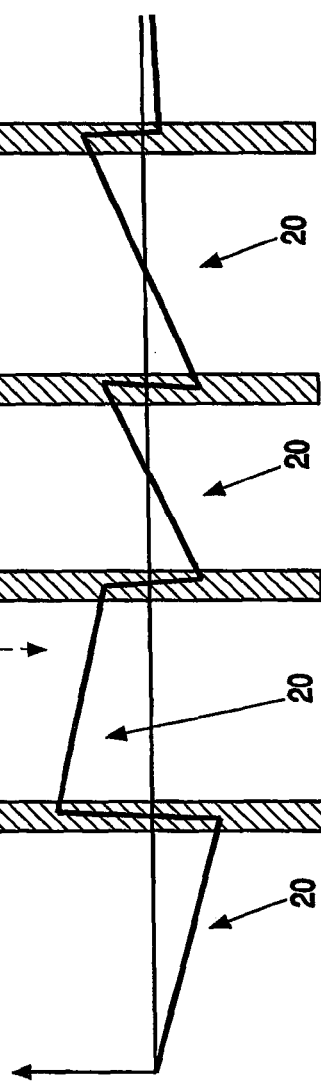

FULL DEPTH MAP ACQUISITION

The invention relates to a method for acquiring a substantially complete depth map from a 3-D scene. The invention further relates to the use of such a method and an integrated circuit providing image processing according to such a method.

The acquisition of 3D video is still a challenge in image processing. It can be done by a special camera, multiple cameras, and processing, or a 2D-to-3D conversion process. The latter computer vision task is very important in the transition from 2D to 3D, as it enables the introduction of 3D video while reusing existing 2D video recording and transmission infrastructure. Still, these approaches are far from the goal of producing high-quality 3D video for arbitrary natural content.

Knowledge about human 3D perception plays a key role in 3D video system design. For example, it is already known that showing a scene with less 3D than reality offers, may still be enjoyed very much or even be experienced more natural. With regard to human perception, people are in general more sensitive to differences rather than absolute measures.

There are already many algorithms for 2D to 3D conversion. Their results may have different modality and may have very different accuracies. In terms of modality, there is a difference between quantitative approaches that yield depth values, and qualitative approaches that yield only depth orderings. The modality of the acquired values may be the values or its first or higher order derivatives.

Whenever 3-D still images or video have to be acquired, the respective 2-D images are first of all captured by conventional cameras or expensive depth cameras. In order to retrieve 3-D images from said 2-D images, these 2-D images have to be processed appropriate. This processing is complex, and requires high computational effort. Furthermore, in case images are taken by depth cameras, the topological complexity of the recorded scene is limited. Only a single frontal view is captured, in which objects behind foreground objects cannot be captured. Only by taking scenes from different angles, more complex objects may be captured. Depth cameras record 3-D images directly. The 3-D information may drive 3-D display directly, but 3-D quality is not sufficient.

One major focus of 3-D image processing is structure from motion retrieval, which is a quantitative method and relies on motion within the image, thus will not be applicable to still images.

Examples of qualitative algorithms are those that use occlusion semantics, e.g. by examining the dis- and reappearing of objects within a video, and so called T-junction analysis for still images.

Both methods provide depth information which is incomplete. The quantitative method has an uncertainty interval, the qualitative method provides only depth ordering information.

It is an object of the invention to provide a method for 3-D image acquisition which provides full 3-D depth maps from partial depth maps. It is a further object of the invention to provide a method for 3-D image acquisition, which takes human perceptual constraints for processing into account.

These and other objects are solved by a method for acquiring a substantially complete depth map from a 3-D scene with the steps of acquiring partial depth map from said 3-D scene, acquiring derivates of depth information from said scene, and extending said partial depth map by adding non-relevant information to said partial depth map, creating a pixel dense fall depth map being spatially consistent with both said partial depth map and said derivates of depth information.

The invention is based on the insight that humans have sensors for both brightness itself and its spatial/temporal derivative. Evidence for direct brightness sensors is that we are able to see whether it is light or dark even in the absence of any texture (spatial derivative is zero, e.g. when the eyes are covered by a piece of paper). Further people cannot see texture unless the brightness is constantly changing over time, i.e., has a non-zero temporal derivative. To see still images, human eyes make micro-movements constantly in an unconscious way. The spatial brightness derivatives arising from the texture are then converted into a temporal derivative that can be measured.

Furthermore humans may only perceive part of an image as relevant for 3-D information. Said partial depth information carries information about depth within an image, which has a high accuracy. In some regions of an image, the depth information is more exact than in other regions.

According to the invention, the first step is to retrieve the most relevant depth information within the image. These regions may at least be regions with depth discontinuities. The derivates of said depth information will be acquired in the next step.

The partial depth information within said partial depth map and the derivates of depth information allow the calculation of a full depth map. By using depth information of different modalities, the depth perception may be re-modeled and the retrieved full depth map matches good with depth information which humans perceive from real 3-D scenes. The fall depth map is pixel dense, which results in depth information for substantially any pixel within the depth map.

This non relevant data may smoothen the objects from one discontinuity to the next discontinuity. Said full depth map may represent a best match between the retrieved depth discontinuities, its derivates, and smoothness within objects.

The resultant pixel dense depth map may be retrieved, in case a method according to claim 2 is provided. By taking the partial depth map and the depth derivates, the resulting values comprise variance due to noise. Using for example a Markov Random Field model will make it possible to find a pixel dense full depth map which is spatially consistent with the measured depth values. An energy function U may be defined by a Gibbs/Markov Random Field model. This model represents all pixels within the pixel dense pixel map. Maximization of probability P is equal to minimization of energy U. The advantage is that the equations are simpler, and that the dynamic range of U is much smaller than that of P. The minimization of U yields a best matching pixel dense depth map, which may be modeled by the characteristics of human depth perception.

A further image processing according to claim 3 is proposed. By extracting depth information from quantitative processing, the depth value with an uncertainty range is available. To allow for adding non-relevant information to the image, the depth values with low uncertainty values are used. These are areas, where depth discontinuities occur, or where image texture is high. Coming from these depth values, the discontinuities may be used to obtain a full depth map, where the unknown depth values within objects match with the depth values resulting in said non-relevant data The non-relevant information allows to process an image, which has a perceptually fill depth map, thus creating a 3-D image.

As areas with high textures allow for extracting depth values with low uncertainty, a method according to claim 4 is preferred.

To allow for acquiring partial depth information, a method according to claim 5 is proposed. Qualitative image processing allows to determine depth discontinuities, and possibly the direction of the discontinuity. By that, objects may be detected, as well as ordering information about the depth ordering of said objects. The qualitative image processing may use object segmentation and T-shape detection. By using image segmentation, the number and size of objects within an image may be retrieved. By applying T-shape detection, a possible ordering between the detected objects may be retrieved. The method according to the invention then fills arbitrary depth values into the pixel dense depth map that comply with the found depth ordering.

The depth of a complete image may be chosen to be N units. It may be chosen to match with the depth capabilities of the specific display device, or in case the image processing is done at transmitter side, according to some standard. In general, the pixel dense depth map may be acquired such that among different possible depth maps and object ordering, the specific depth map filled with non-relevant data that best complies with both smoothness and partial depth information from ordering rules is chosen.

Object segmentation according to claim 6 is proposed. By applying object segmentation to the image, objects may be detected. The ordering of the objects may be further extracted, e.g. by T-shape detection. With information about objects and object ordering, the non-relevant data may complete the partial depth map. This may be done by calculating a pixel dense depth map, which pixel values match best with estimated pixel values. These estimated pixel values may be calculated from the known depth information, the known depth derivates and a depth model, modeling the depth perception of humans. This model may take variance, noise and different factors into account. The model is compared to the pixel dense depth map. The best matching pixel dense depth map results in a minimized energy or a maximized Gibbs/Markov Random Field.

A method according to claim 7 is further proposed. Human depth perception may be modeled by different depth sensors. Each model results in different energy values of the pixel dense depth map and a different best matching pixel dens depth map. The sensors of human depth perception may comprise Gaussian noise, spatially variant or invariant, Non-Gaussian Noise, negative exponential noise, sensor saturation, bimodal sensor noise, or saturated bimodal sensor noise.

The task of the sensory data processing algorithm is to calculate a pixel dense depth map with depth values $i_{perc}$ on the basis of the sensor measurements for depth and its derivative as input data $i_{sens}$ and $\nabla i_{sens}$. This may be calculated according to claim 8. To calculate a best matching depth map, the minimization of U(i) over all depth values is required. U(i) may be a Markov Random Field model.

This may be done by a so-called Simulated Annealing (SA) algorithm. This algorithm just starts with some initial estimate of i, e.g. $i_0 = i_{sens}$, and then runs through a series of ik, until convergence to the minimum of U is reached. At each transition from ik to ik+1, random perturbations are made to i at every pixel positions independently, each of which causes U to change by some $\nabla U$. Whenever a perturbation results in $\nabla U<0$ (lower or better U) the perturbation at pixel p is accepted. Whenever $\nabla U>0$ (higher or worse U), the perturbation is accepted only with a probability that is rapidly decreasing with $\nabla U$.

The characteristics of the SA algorithm enable it to find the minimum of U efficiently, while avoiding local minima The SA algorithm requires two parameters, $\sigma_{perturb}$ that regulates the size of the perturbations and so-called temperature T that regulates how perturbations leading to worse U are accepted.

To speed up the algorithm substantially, it may be applied in a so-called hierarchical fashion. At first a lower resolution versions of the input data $i_{sens}$ and $\nabla i_{sens}$, is calculated and then the SA algorithm is run again to obtain a lower-resolution version of the result $i_{perc}$. After that, the same is done with the resolution shifted up one level, but now using the previous result $i_{perc}$ as initial estimate. This continues until the original, full resolution is reached. The random perturbation noise for the SA algorithm may be selected to be Gaussian with variance $\sigma_{perturb}$.

A further aspect of the invention is an integrated circuit providing image processing of still and/or motion images according to a pre-described method. Yet a further aspect of the invention is the use of a pre-described method in consumer electronics, television and computer vision products.

These and other aspects of the invention will be apparent from and elucidated with reference to the following figures. In the figures show:

FIG. 1 methods to obtain partial depth information;

FIG. 2 qualitative depth processing;

FIG. 3 quantitative depth processing.

FIG. 1a depicts a method for quantitative depth processing. Depicted is an object 2a in front of a wall 2b. Further depicted are cameras 4, a quantitative processing 6 and the result of quantitative processing 6 in form of a partial depth map 8, with depth information 8a and an depth uncertainty 8b.

The objects 2 are captured by cameras 4. The cameras 4 capture, along with their 2-D images, depth information by processing both images. The exact depth information may not be retrieved by the two cameras 4. The local depth accuracy depends, among other factors, to the local amount of image texture. Further depth information may be retrieved from depth discontinuities. The result of quantitative depth processing 6 is a graph of partial depth information 8, with depth data 8a and an uncertainty range 8b.

The real depth information of a scene is represented within FIG. 3a The result of quantitative depth processing is depicted in FIG. 3b. The graph of real depth values 8a is depicted in FIG. 3b. At certain spatial positions 16, the depth information has discontinuities. These discontinuities 16 may occur due to the change between different objects. The accuracy of depth information in the vicinity of these discontinuities 16 is high.

As depicted in FIG. 3b, the accuracy of depth information is shown by range 8b. In case of discontinuities and of high amount of local texture, the accuracy is high, the uncertainty small.

As depicted in FIG. 3c, the result of a method according to the invention results in a pixel dense depth map with a smooth depth profile which complies with the partial depth information such as said discontinuities 16. The depth values of depth discontinuities 16 are copied to the resulting depth map, together with depth information of high accuracy at positions with high image texture 18. The resulting depth map is consistent with the partial depth information 16, 18, retrieved from the partial depth maps captured by the cameras 4. The partial depth information 16 is extended by non relevant data to realize a smooth depth map 20. This may be done by pertubating depth values within depth maps to find a best matching pixel dense depth map compared to the spatial depth information, the depth derivatives and a depth perception model, modeling the depth perception of humans.

To extend the partial depth information of high accuracy 16, 18, with non-relevant data, a Markov Random Field (MRF) method is applied. The partial depth information is $D_{alg}$, its uncertainty $\gamma D_{alg}$. The depth map itself is D. $\Lambda_{S4}$ represents a grid containing all edges Q in between two horizontally neighboring pixel pairs $P_{Q1}$ and $P_{Q2}$. $\Lambda_I$ is a set of all pixelgrid positions. The energy functions U of smoothness $U_{smoothness}$ and depth values $U_{copy}$ may be:

$$U_{smoothness} = \alpha \sum_{Q \in \Lambda S_4} |D(P_{Q2}) - D(P_{Q1})|^2$$

$$U_{copy} = \beta \sum_{P \in \Lambda_1} \left| \frac{D(P) - D_{alg}(P)}{\Delta D_{alg}(P)} \right|^2.$$

The minimization of $U_{copy}$ alone enforces the depth map D to be a copy of $D_{alg}$. Adding a small value to the denominator prevents it from being zero. The minimization of $U_{smoothness}$ alone enforces a smooth depth map D over the entire image, without any depth information. The minimization of both $U_{smoothness}$ and $U_{copy}$ provides a trade-off between the smoothness and copy constraints, given by $\alpha$ and $\beta$. By adding non-relevant information to the partial depth map a full depth map may be constructed, which enables 3-D perception of a scene from a 2-D image. This non-relevant depth information may be retrieved by comparing the pixel dense depth map with different non-relevant depth information with the partial depth information, the depth derivates and a perception model of human depth perception.

In FIG. 1b a qualitative processing of depth information is depicted. Objects 2a, 2b, and 2c are captured by camera 10. Image segmentation and T-shape detection is carried out on the captured image. By qualitative processing 12, depth discontinuities 14 at the position 13 within the image, may be determined. The direction of the first discontinuity 14a is not known. The direction of the following discontinuities 14b, 14c is known. By image segmentation 12a, the shape of the objects may also be extracted, revealing two hexagons 2a, 2c and a wall 2b. The qualitative processing reveals that hexagon 2c is in front of hexagon 2a, and in front of wall 2b. The resultant depth information is incomplete. It comprises derivates of depth values.

Said qualitative processing is depicted in FIG. 2. The captured image 22 is first segmented. The result of image segmentation 24 reveals two hexagons. The depth ordering is extracted by T-shape detection, which result is depicted in 26. The ordering information is incomplete. It is known, that A is in front of B. The ordering of C and B is not known. By applying the extension according to the invention, arbitrary depth values, that comply with the found depth ordering, are filled in the image. Object A is assigned a depth value indicating that A is N "depth units" in front of B and C. The resulting image 28, has depth information added to the objects, that complies with the found depth ordering. In case of circular depth ordering, it is not possible to find single values for the depth of the objects. In these cases, it is appropriate to fill in non-relevant information that allows perceived depth to change smoothly within the objects. One depth map may be found that complies both with partial depth information and smoothness constraints.

A method to find such a depth map may be a Markov Random Field (MRF) method. The depth extension may be obtained via a process involving partial depth information spread over the entire image. The energy function $U_{smoothness}$ and $U_{ordering}$ are to be minimized over the entire depth map D. With S as the segmentation map retrieved from image segmentation, being 0 inside object areas and 1 at object edges, N the number of depth units and V the direction of each discontinuity, which may be −1, 0, 1. For minimization, a so-called Simulated Annealing algorithm may be appropriate. The energy functions may be $$U_{smoothness} = \alpha \sum_{Q \in S_4} (1 - S(Q)) |D(P_{Q2}) - D(P_{Q1})|^2$$

$$U_{copy} = \beta \sum_{P \in \Lambda_1} S(Q) |D(P_{Q2}) - D(P_{Q1}) - NV(Q)|^2.$$

The minimization of $U_{smoothness}$ alone enforces a smooth depth map D within each object. The minimization of $U_{ordering}$ alone enforces the depth map to have discontinuities, with arbitrary depth size N. The minimization of $U_{smoothness}$ and $U_{ordering}$ provides a trade-off between smoothness and ordering constraints. Depending on which aspect (depending on $\alpha$ and $\beta$) is stressed more, the resulting depth map will contain discontinuities only along the object edges with only a small spatial extend from the edges into the objects, or a more smooth result with depth edges that extend for several tens of pixels.

Many energy functions are applicable, having different minimization results. Besides using square values $|x|^2$, as already mentioned above, it is possible to use absolute values $|x|$, or asymmetrical functions such as $|x|-x$.

In case both qualitative as well as quantitative depth values are available, any linear combination of $U_{smoothness}$, $U_{copy}$, and $U_{ordering}$ may be used for minimization By this the characteristics of the extended depth map may be influenced. In case discontinuity values S and V are not available, they can be retrieved from $D_{alg}$ and $\Delta D_{alg}$ by:

$$S(Q) = \begin{cases} 1 & |D_{alg}(P_{Q2}) - D_{alg}(P_{Q1})| > T + \Delta D_{alg}(P_{Q1}) + \Delta D_{alg}(P_{Q2}) \\ 0 & \text{else} \end{cases}$$

$$V(Q) = S(Q) \text{sign}(D_{alg}(P_{Q2}) - D_{alg}(P_{Q1}))$$

whereby T is a threshold value determining whether a certain depth jump is ascribed as discontinuity or not.

By applying the inventive method to 2-D images, it is possible to produce a 3-D perception of a scene, which complies both with respect to object smoothness and object discontinuities.

The invention claimed is:

1. Method for acquiring a substantially complete depth map from a 3-D scene with the steps of:
   a) acquiring an image of said 3-D scene using less than three cameras,
   b) acquiring partial depth map from said image,
   c) acquiring derivates of depth information from said image,
   d) extending said partial depth map by adding non-relevant information to said partial depth map, creating a pixel dense full depth map being spatially consistent with both said partial depth map and said derivates of depth information.

2. Method according to claim 1, characterized in that said non-relevant information extending said depth map is calculated by maximizing a probability function containing said non-relevant information, said partial depth map and said derivates of said depth map.

3. Method according to claim 1, characterized in that said partial depth information and said derivates of depth information is acquired by quantitative image processing.

4. Method according to claim 1, characterized in that said partial depth information is acquired by detecting a local amount of image texture, and determining depth from spatially high textured areas.

5. Method according to claim 1, characterized in that said partial depth information and said derivates of depth information is acquired by qualitative image processing.

6. Method according to claim 1, characterized in that said partial depth information is acquired by object segmentation to determine objects within said at least one image and by detecting the ordering of objects.

7. Method according to claim 1, characterized in that human depth perception is modeled by depth sensors and that said pixel dense full depth map is calculated based on properties of said depth sensors.

8. Method according to claim 1, characterized in that said pixel dense full depth map is calculated by perturbating pixel values not defined by said partial depth map and said derivates of said depth map and minimizing said probability function.

9. Integrated circuit providing image processing of said at least one image according to claim 1.

10. Use of a method according to claim 1 in consumer electronics, television and computer vision products.

11. Method according to claim 1, wherein the less than three cameras and said scene are stationary relative to each other.)

12. Method according to claim 1, wherein the non-relevant depth information is obtained by comparing the pixel dense depth map with different non-relevant depth information with the partial depth information, the depth derivates and a perception model of human depth perception.

13. System for acquiring a substantially complete depth map from a 3-D scene, the system comprising:

a) less than three cameras for acquiring an image of said 3-D scene; and, b) an integrated circuit for providing image processing of said one image, said integrated circuit comprising:

c) acquiring partial depth map from said at image, d) acquiring derivates of depth information from said image, and e) extending said partial depth map by adding non-relevant information to said partial depth map, creating a pixel dense full depth map being spatially consistent with both said partial depth map and said derivates of depth information.

14. Method for acquiring a substantially complete depth map from a 3-D scene with the steps of:

acquiring an image of said 3-D scene using less than three cameras;

acquiring partial depth map from said at least one image, said partial depth map having depth data, an uncertainty range, and discontinuities;

acquiring derivates of depth information from said one image; and extending said partial depth map by adding non-relevant information to said partial depth map, creating a pixel dense full depth map with a smooth depth profile being spatially consistent with both said partial depth map and said derivates of depth information.

* * * * *